(12) United States Patent
Hui et al.

(10) Patent No.: US 6,674,820 B1
(45) Date of Patent: Jan. 6, 2004

(54) RECEIVER DEVICES, SYSTEMS AND METHODS FOR RECEIVING COMMUNICATION SIGNALS SUBJECT TO COLORED NOISE

(75) Inventors: Dennis Hui, Cary, NC (US); Kambiz C. Zangi, Durham, NC (US); Rajarem Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/504,216

(22) Filed: Feb. 15, 2000

(51) Int. Cl.[7] ................................. H03D 1/04

(52) U.S. Cl. ....................................... 375/346
(58) Field of Search ................. 375/346, 316, 375/343, 350, 229; 708/322, 323, 300

(56) References Cited

U.S. PATENT DOCUMENTS

| 5,572,552 | A | * | 11/1996 | Dent et al. | 375/343 |
| 5,905,743 | A |   | 5/1999  | Ramesh     | 371/43.7 |
| 6,470,044 | B1 | * | 10/2002 | Kowalski   | 375/148 |
| 6,483,885 | B1 | * | 11/2002 | Bradley et al. | 375/366 |

OTHER PUBLICATIONS

G. David Forney, *Maximum–Likelihood Sequence Estimation of Digital Sequences in the Presence of Intersymbol Interference*, IEEE Transactions on Information Theory, vol. IT–18, No. 3, May 1972.

John G. Proakis, Excerpts of *Digital Communications*, 1989.

Gottfried Ungerboeck, *Adaptive Maximum–Likelihood Receiver for Carrier–Modulated Data–Transmission Systems*, IEEE Transactions on Communications, vol. COM–22, No. 5, May 1974.

Torsten Söderström, *Convergence Properties of the Generalised Least Squares Identification Method*, $3^{rd}$ IFAC symposium on Identification and System Parameter Estimation, Hague/Delft, The Netherlands, Jun. 1973.

Lennart Ljung, *System Identification: Theory for the User*, pp. 288–300.

Lin et al., *Optimal Tracking of Time–Varying Channels: A Frequency Domain Approach for Known and New Algorithms*, IEEE Transactions on Selected Areas in Communications, vol. 13, No. 1, Jan., 1995.

(List continued on next page.)

Primary Examiner—Khai Tran
(74) Attorney, Agent, or Firm—Myers Bigel Sibley & Sajovec

(57) ABSTRACT

Methods, systems and receiver devices are provided which may provide improved receiver performance in obtaining estimates of the complex-valued baseband channel in the presence of colored baseband noise. In various embodiments of the present invention, systems and methods are provided in which, over each synchronization signal period or other determinate information window, the channel coefficients and the color of the baseband noise are concurrently estimated. Thus, both the channel coefficients and the color of the noise are estimated, rather than assuming white noise, and channel coefficients may be provided that account for the color of the noise These estimates may be provided for each burst of a communication and may result in an improved channel estimate in the presence of colored noise. The baseband noise can become colored due to, for example, having a non-Nyquist receive filter, due to the presence of a colored co-channel interferer, or due to the presence of an adjacent channel interferer. The concurrent estimates of the color of the noise and channel coefficients may be provided iteratively or by selection of a best result among a plurality of candidate noise color assumptions.

44 Claims, 6 Drawing Sheets

OTHER PUBLICATIONS

U.S. patent application No. 09/450,684 entitled "Methods, Receiver Devices and Systems for Whitening a Signal Disturbance in a Communication Signal".

Chong–Meng Samson See et al., *Spatio–Temporal Channel Identification and Equalization in the Presence of Strong Co–Channel Interference, Signal Processing*, Amsterdam, NL, vol. 78, No. 2, Oct. 1999, pp. 127–138.

Norm W.K. Lo et al., *Adaptive Equalization for Co–Channel Interference in a Multipath Fading Environment, IEEE Transactions on Communications*, vol. 43, No. 2/04, Feb. 1, 1995, pp. 1441–1453.

Chandrasekaran R. et al., *A Constrained Least–Squares Algorithm with Data–Adaptive Beamforming and Equalization for Cochannel TDMA Signals, Signal Processing*, Amsterdam NL, vol. 80, No. 10, Oct. 2000, pp. 2033–2047.

Karlsson J. et al., *Interference Rejection Combining for GSM, International Conference on Universal Personal Communications, Proceedings of ICUPC—5th International Conference*, vol. 1, pp. 433–437 1996.

Copy of International Search Report for PCT/US01/01773.

\* cited by examiner

RECEIVER DEVICES, SYSTEMS AND METHODS FOR RECEIVING COMMUNICATION SIGNALS SUBJECT TO COLORED NOISE

BACKGROUND OF THE INVENTION

The present invention relates to communications methods and apparatus, and more particularly, to methods and apparatus for receiving communications signals subject to noise such as those typically found in wireless communication systems. Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

Wireless communications systems such as cellular radiotelephone systems typically include a plurality of communication channels which may be established between a first transceiver (such as a base station) and a second transceiver (such as a mobile terminal). The communication channels typically are subject to performance-degrading environmental effects such as multi-path fading and additive disturbances. These various sources of additive disturbances may come from a variety of sources including thermal noise, a co-channel interferer and an adjacent-channel interferer.

The dynamic characteristics of the radio channel present difficulties in estimating the channel to allow for decoding of information contained in the received signal. Often, in wireless mobile radio systems, known data sequences are inserted periodically into the transmitted information sequences. Such data sequences are commonly called synchronizing sequences or training sequences and are typically provided at the beginning and/or in the middle of a frame of data or a burst of data. Channel estimation may be carried out using the synchronizing sequences and other known parameters to estimate the impact the channel has on the transmitted signal. Least square estimation may be an efficient way of estimating the channel impulse response in the presence of additive white Gaussian noise. However, as the noise becomes non-white, or colored, these techniques may become less effective.

To extract the transmitted signal (or symbols) from the received signal, the receiver of a mobile terminal typically includes a demodulator which may be a coherent demodulator such as a maximum likelihood sequence estimation (MLSE) demodulator (or equalizer). To adapt to the channel variation from each data burst to the next, an associated channel estimator is typically provided for the demodulator. The channel estimator typically operates using known transmitted symbols.

At any given time, the kind of disturbances (co-channel interferences, adjacent-channel interference, or thermal noise) that dominates in the received signal is generally unknown. The typical approach is to design the demodulator or the equalizer in the receiver assuming the dominant disturbance is white (i.e. uncorrelated in time), hoping that it will suffice well even when the disturbance is somewhat colored.

For example, consider the receiver model depicted in FIG. 1. A signal y(t) is first filtered in an analog receive filter 105 having a transfer function p(t) to provide a received signal r(t) which is downsampled to a symbol rate received signal r(n) before processing in the equalizer 110 to get a signal estimate $s_{est}(u)$. As used herein, the term "symbol rate" encompasses both the symbol transmission rate and multiples thereof. The symbol-rate downsampled discrete-time received signal r(n) is given by:

$$r(n) = \sum_{k=0}^{L-1} c(k)s(n-k) + v(n) \quad (1)$$

where c(k) are the L coefficients of the baseband channel, s(n) are the transmitted symbols, and v(n) is a disturbance signal.

As noted above, to aid in estimating the channel c(k) at the receiver, the transmitter typically transmits a synchronization signal including a number of known symbols: $\{s(n)\}_{n=n0}^{n0+M-1}$. The channel coefficients, c(k)'s, are then estimated using the known transmitted symbols $\{s(n)\}_{n=n0}^{n0+M-1}$ and the known received signal $\{r(n)\}_{n=n0}^{n0+M-1}$. Generally, this is done by assuming that the disturbance v(n) is white, in other words, that the auto-correlation of v(n), $\rho_{vv}(k)=\delta(k)$. Based on this assumption, the maximum likelihood (ML) estimate, expected to be the optimal estimate, of the c(k)'s is the least-squares estimate.

The auto-correlation function of the disturbance v(n) may be defined as:

$$\rho_{vv}(k)=E\{v(n)v^*(n-k)\} \quad (2)$$

where k is the auto-correlation lag and E{ } represents the expected value. It is known that the least-squares estimate may be obtained as the solution to the following optimization criteria:

$$\hat{c}_{LS}(k) = \underset{c(k)}{\arg\min} \sum_{n=n0+L}^{n0+M-1} |r(n) - \hat{r}[n \mid n-1; c(k); \rho_{vv}(k) = \delta(k)]|^2 \quad (3)$$

$$= \underset{c(k)}{\arg\min} \sum_{n=n0+L}^{n0+M-1} \left| r(n) - \sum_{k=0}^{L-1} c(k)s(n-k) \right|^2 \quad (4)$$

where $\hat{r}[n|n-1;c(k);\rho_{vv}(k)]$ is the one-step ahead prediction of r(n) given $\{r(k):k<n\}$, $\{s(k):k \leq n\}$ and the channel coefficients c(k). It is further based on the assumption that the signal disturbance is white noise, in other words, that the auto-correlation of the disturbance $\rho_{vv}(k)=\delta(k)$. When the noise v(n) is not white (i.e. $\rho_{vv}(k) \neq \delta(k)$), the least-squares estimate defined in equation (4) is not expected to be the maximum likelihood (ML) estimate of c(k).

In a typical cellular system, the disturbance v(n) can be modeled as the sum of three signals passed through the analog receive filter p(t):

$$v(t)=[v_{co}(t)+v_{adj}(t)+v_{TH}(t)]*p(t) \quad (5)$$

$$v(n)=v(n \times T_{symbol}), \quad (6)$$

where $v_{co}(t)$ is the analog co-channel interferer before the receive filter; $v_{adj}(t)$ is the analog adjacent channel interferer before the receive filter; $v_{TH}(t)$ is the thermal noise before the receive filter; and p(t) is the analog receive filter. Finally, v(n) is obtained by sampling v(t) every $T_{symbol}$ seconds.

Note that v(n) might become colored because $v_{co}(t)$ or $v_{adj}(t)$ can be colored. Moreover, v(n) might become colored because p(t) is not a Nyquist filter. In other words, the signal disturbance v(n) may become colored and the color of the disturbance may change from burst to burst of the communications signal. A colored signal disturbance may result in degraded performance because, as noted above, once the disturbance is colored, the ML estimate of the channel coefficients is typically not the least-squares estimate defined in equation (4).

SUMMARY OF THE INVENTION

According to embodiments of the present invention, methods, systems and receiver devices are provided which may provide improved receiver performance in obtaining estimates of the complex-valued baseband channel in the presence of colored baseband noise. The standard Least Squares (LS) channel estimation method may result in a suboptimal channel estimate when the baseband noise is colored as this method generally assumes that the noise is white. In some embodiments of the present invention, systems and methods are provided in which, over each synchronization signal period or other determinate information window, the channel coefficients and the color of the baseband noise are concurrently estimated. Thus, both the channel coefficients and the color of the noise are estimated rather than assuming white noise and providing channel coefficients that account for the color of the noise These estimates may be provided for each burst of a communication and may result in an improved channel estimate in the presence of colored noise. The baseband noise can become colored due to, for example, having a non-Nyquist receive filter, due to the presence of a colored co-channel interferer, or due to the presence of an adjacent channel interferer. The concurrent estimates of the color of the noise and channel coefficients may be provided iteratively or by selection of a best result among a plurality of candidate noise color assumptions in various embodiments.

In embodiments of the present invention, methods are provided for receiving a communication signal subject to colored noise over a communication channel. The communication signal including the colored noise is received at a receiver device. A channel estimate for the communication channel is determined based on the received signal, predetermined information associated with the received signal and an estimated color characteristic of the colored noise. A signal estimate for the received signal is generated using the determined channel estimate. The channel estimate may be determined using a generalized least squares algorithm. In alternative embodiments, the channel estimate may be determined by selecting a maximum likelihood one of a plurality of candidate channel estimates as the channel estimate, where each of the plurality of candidate channel estimates is based on one of a plurality of candidate noise color characteristic of the colored noise. The color characteristic of the colored noise may be an auto-correlation of the colored noise. The predetermined information may be a synchronization signal.

In other embodiments, a channel estimate is determined as follows. An initial channel estimate is generated based on an assumed auto-correlation, such as white noise, the received signal and the predetermined information. An updated auto-correlation is generated based on the initial channel estimate, the received signal and the predetermined information. An updated channel estimate is generated based on the updated auto-correlation, the received signal and the predetermined information. The initial channel estimates may be least squares channel estimates. The channel estimates are preferably channel coefficients. The generation of initial channel coefficients, an updated auto-correlation and updated channel coefficients is preferably repeated for a selected number of iterations. A predetermined number of iterations may be used or operations may repeat until a performance criteria is satisfied.

In other embodiments, the initial channel coefficients are generated using the equation:

$$\hat{c}(k) = \underset{c(k)}{\arg \min} \sum_{n=n0+L}^{n0+M-1} |r(n) - \hat{r}[n \mid n-1; c(k); \rho_{vv}(k) = \delta(k)]|^2$$

where $\hat{r}[n|n-1;c(k);\rho_{vv}(k)]$ is a one-step ahead prediction of r(n) given $\{r(k):k<n\}$, $\{s(k):k \leq n\}$, channel coefficients c(k) and the noise auto-correlation $\rho_{vv}(k)=\delta(k)$. The updated auto-correlation may be generated using the equation:

$$\hat{\rho}_{vv}(l) =$$

$$\frac{1}{M-L} \sum_{n=n0+L}^{n0+M-1-l} \left( r(n+l) - \sum_{k=0}^{L-1} \hat{c}(k)s(n+l-k) \right)\left( r(n) - \sum_{k=0}^{L-1} \hat{c}(k)s(n-k) \right)^*$$

where $\hat{\rho}_{vv}(l)$ is an estimate of the l-the auto-correlation lag of the disturbance v(n), l is the auto-correlation lag, M is the number of known transmitted symbols, L is the length of the channel estimate (such as the number of channel coefficients), n0 is the index of the first known transmitted symbol, ĉ(k) is a previously obtained channel estimate, r(n) is the discrete-time received signal and s(n) are the known transmitted symbols. The updated channel coefficients may be generated as follows. A whitening filter for the colored noise may be formed based on the updated auto-correlation. The received signal and the predetermined information associated with the received signal may be filtered using the determined whitening filter and updated channel coefficients may be generated based on the filtered received signal, the filtered predetermined information associated with the received signal and the updated auto-correlation using the equation:

$$\hat{c}(k) = \underset{c(k)}{\arg \min} \sum_{n=n0+L+q}^{n0+M-1} \left| r'(n) - \sum_{k=0}^{L-1} c(k)s'(n-k) \right|^2$$

where r'(n) is r(n) filtered by the whitening filter, s'(n−k) is s(n) filtered by the whitening filter and delayed by k samples and q+1 is the length of the whitening filter. A finite impulse response whitening filter may be used.

In further embodiments, the communication signal comprises a plurality of bursts and wherein the predetermined information associated with the received signal is a synchronization signal included in each of the plurality of bursts. The channel estimate for the communication channel may be determined for each respective burst based on the synchronization signal included in the respective burst to provide a channel estimate associated with the respective burst. The signal estimate for the received signal may be generated for each respective burst using the channel estimate associated with the respective burst.

In other embodiments of the present invention, a plurality of candidate channel estimates, preferably channel coefficients, are generated. Each of the plurality of candidate channel estimates is based on one of a plurality of candidate auto-correlations. One of the plurality of candidate channel estimates is selected as the channel estimate. The plurality of sets of channel coefficients may be generated as follows. One of the plurality of candidate auto-correlations may be selected and a whitening filter may be determined based on the selected one of the plurality of auto-correlations. The received signal and the predetermined information associated with the received signal may be filtered using the determined whitening filter. One of the plurality of sets of channel coefficients may be generated based on the filtered received signal and the filtered predetermined information associated with the received signal. Operations may be repeated selecting, determining a whitening filter, filtering and generating one of the plurality of sets of channel coefficients for others of the plurality of candidate auto-correlations to provide the plurality of sets of channel coefficients.

In further embodiments of the present invention, each of the plurality of sets of channel coefficients $\{\hat{c}_i(k)\}_{i=1}^N$, where N is the number of candidate autocorrelations and i indicates the particular set of channel coefficients that is based on one of the plurality of candidate autocorrelations, may be generated using the equation:

$$\hat{c}_i(k) = \mathop{\arg\min}_{c(k)} \sum_{n=n0+L+q_i}^{n0+M-1} \left| r_i'(n) - \sum_{k=0}^{L-1} c(k) s_i'(n-k) \right|^2,$$

where $r_i'(n)$ is $r(n)$ filtered by the whitening filter associated with the selected candidate autocorrelation, $s_i'(n-k)$ is $s(n)$ filtered by the whitening filter and delayed by k samples, and $q_i+1$ is the length of the whitening filter. For each candidate channel estimate $\hat{c}_i(k)$ obtained above, an associated squared-error may be computed according to the equation:

$$\varepsilon_i = \sum_{n=n0+L+q_i}^{n0+M-1} \left| r_i'(n) - \sum_{k=0}^{L-1} \hat{c}_i(k) s_i'(n-k) \right|^2.$$

The final channel estimate may be selected as the candidate channel estimate whose associated squared-error $\varepsilon_i$ is the smallest. In further embodiments, the whitening filters for each of the plurality of candidate auto-correlations may be generated in advance and stored and a respective one of the stored whitening filters may be selected as the whitening filter for each iteration of generating a candidate set of channel estimates such as channel coefficient sets.

In still further embodiments of the present invention, a receiver device is provided including a receiver that receives wireless communication signals, including a signal disturbance having an associated noise color, and downsamples the received signals to a symbol rate of the communication signals to provide received signal samples. The receiver device further includes an equalizer that generates symbol estimates from the received signal samples, the equalizer having associated channel coefficients, and a channel estimator that generates the channel coefficients based on the received wireless communication signals, predetermined information associated with the received wireless communication signals and the associated noise color of the signal disturbance.

The channel estimator may be further configured to iteratively estimate the channel coefficients and the associated noise color by setting at least one of the channel coefficients and the associated noise color to a value generated in a previous iteration and solving for the other of the channel coefficients and the associated noise color and using the other of the channel coefficients and the associated noise color as the value generated in a previous iteration in a subsequent iteration. In other embodiments, the receiver device further includes a memory configured to store a plurality of candidate auto-correlations and the channel estimator is further configured to generate channel coefficient sets based on each of the plurality of candidate auto-correlations and to select one of the generated channel coefficient sets as the channel coefficients.

As will further be appreciated by those of skill in the art, while described above primarily with reference to method aspects, the present invention may also be embodied as systems.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The present invention may take the form of a hardware embodiment, a software embodiment or an embodiment combining software and hardware aspects.

Figure 1:
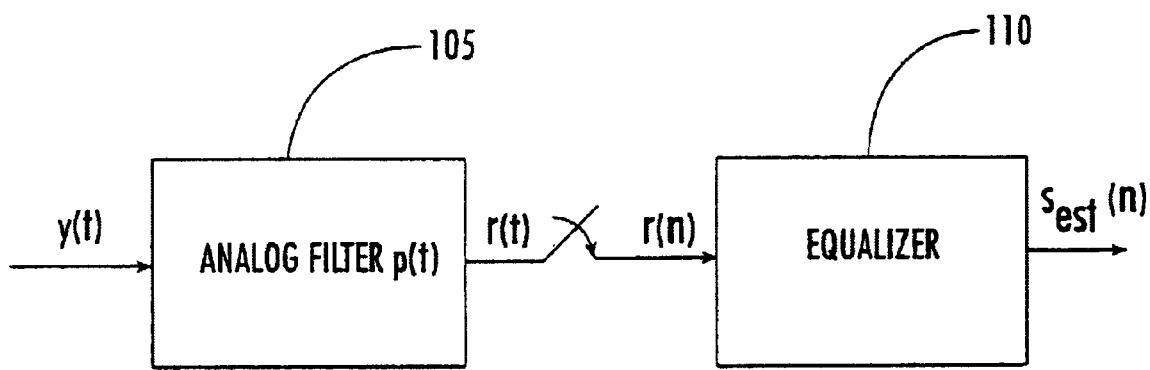
FIG. 1 is a schematic block diagram illustrating a conventional receiver.
Figure 2:
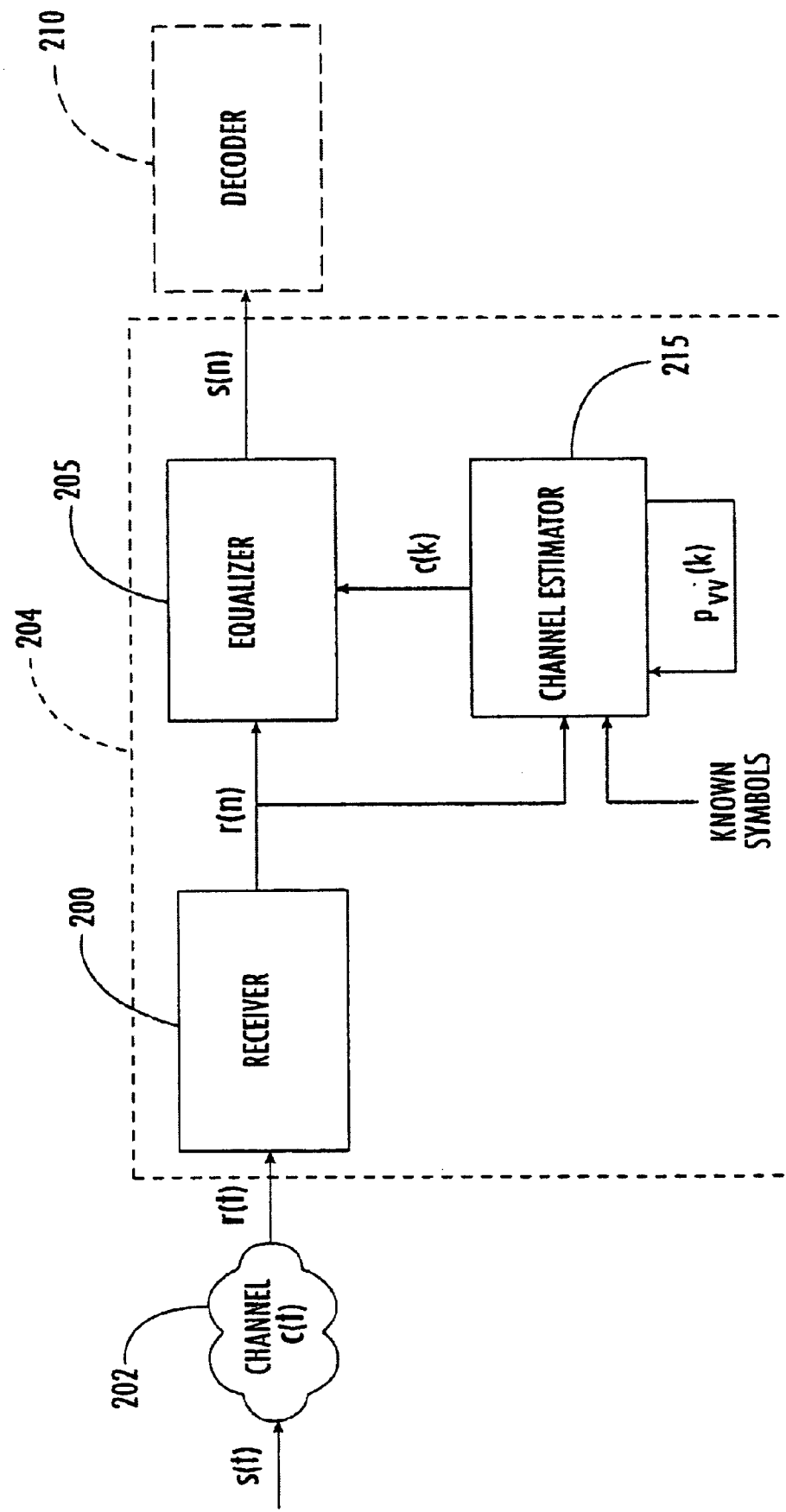
FIG. 2 is a schematic block diagram illustrating a receiver device according to embodiments of the present invention.

The present invention will now be further described with reference to the block diagram illustration of embodiments of the present invention in FIG. 2. As shown in FIG. 2, a signal s(t) is transmitted over a channel 202 having a channel characteristic c(t), such as a wireless cellular radio telephone communication channel. The transmitted signal, including channel induced effects, is received as a signal r(t) at the receiver/RF processor 200 which provides a front end receiver for a receiver device 204 according to an embodiment of the present invention. The receiver 200 may include a radio frequency (RF) processor which provides a front end receiver for receiving the communication signals r(t) which include a signal disturbance, more particularly which may be subject to a colored noise signal disturbance.

The receiver 200, as illustrated in FIG. 2, down samples the received signals to a symbol rate of the communication signals to provide a receive signal r(n). As shown in FIG. 2, the receiver device further includes an equalizer 205 which processes the received signal samples r(n) to generate estimates of the received signals s(n). The output of the equalizer 205 will typically be provided to further signal processing components, such as a decoder 210. The equalizer 205 generates symbol estimates from the received signal samples utilizing associated channel coefficients of the equalizer 205. A channel estimator 215 generates the channel coefficients based on the received wireless communication signals, predetermined information associated with the received wireless communication signals, such as a synchronization signal, and an associated noise color of the signal disturbance.

As illustrated in the embodiment of FIG. 2, the color of the noise may be characterized by its auto-correlation $\rho_{vv}(k)$. Alternatively, an associated power spectrum may be provided as the color characteristic of the noise. More particularly, the channel estimator 215 is configured to iteratively estimate the channel coefficients c(k) and the associated noise color $\rho_{vv}(k)$. Such an iterative estimate may be provided by setting one of the channel coefficients and the associated noise color to a value generated in a previous iteration and solving for the other of the channel coefficients and the associated noise color and then using the other of the channel coefficients and the associated noise color as a value generated in a previous iteration in a subsequent iteration.

Figure 3:
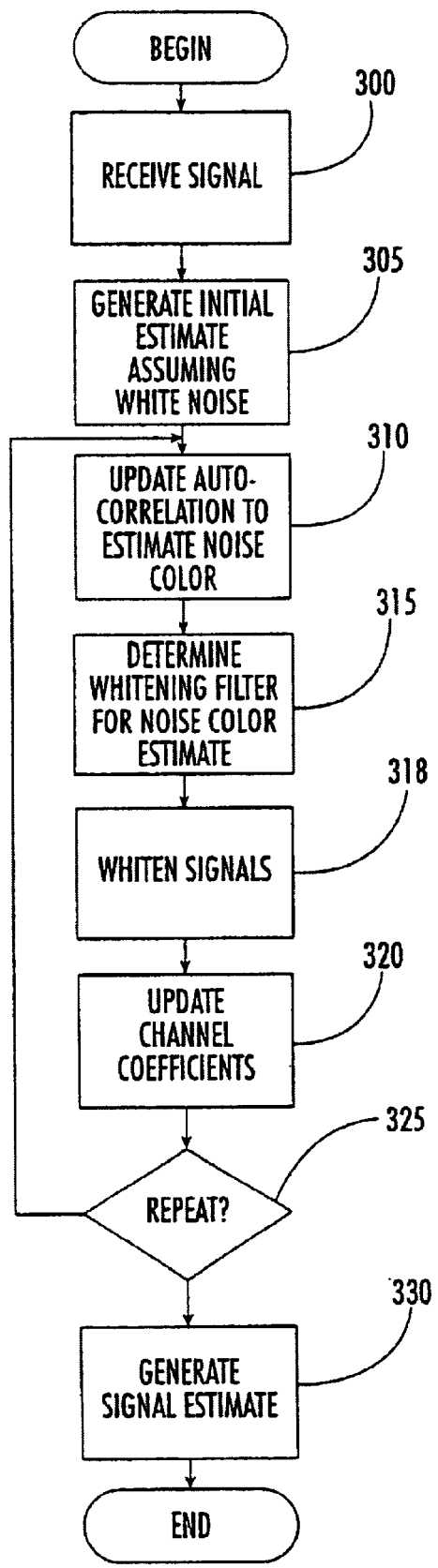
FIG. 3 is a flowchart illustrating operations for embodiments of the present invention.

Referring now to the flowchart illustration of FIG. 3, operations according to embodiments of the present invention for receiving a communication signal subject to colored noise over a communication channel will now be further described. Operations begin at block 300 when a communications signal, including the additive colored noise, is received at the receiver device. In accordance with embodiments of the present invention, a channel estimate for the communication channel based on the received signal, the predetermined information associated with the received signal and an estimated color characteristic of the colored noise, an auto-correlation for the illustrated example, is then generated as will be described with reference to blocks 305–325. An initial channel estimate, a channel coefficient set in the illustrated embodiment, is first generated based on an assumed auto-correlation, preferably a white noise assumption, and the received signal and the predetermined information, preferably a synchronization signal in each burst of the communication signal (block 305). An updated auto-correlation based on the initial channel estimate, the received signal and the predetermined information is then generated. (block 310).

The updated auto-correlation is then used in generating an updated set of channel coefficients which, in the illustrated embodiment, includes providing a whitening filter based on the updated auto-correlation (block 315) and filtering the received signal to whiten the received signals and the predetermined information (block 318). Updated channel coefficients are then generated based on the filtered signals generated based on the updated auto-correlation (block 320). It is to be understood that, for purposes of explanation in the various embodiments herein, the channel estimate may be provided in the form of channel coefficients generated by the channel estimator 215 for the equalizer 205.

Operations as described at blocks 310 through 320 are repeated for a number of iterations (block 325) such as a fixed predetermined number of iterations or a variable number of iterations depending upon a quality measure criteria for the channel coefficients. For example, operations could be repeated until the incremental improvement in the channel estimate, for example as measured by equation 7 below, is less than a specified value. A signal estimate for the received signal may then be generated using the determined channel coefficients (block 330).

Operations as generally described with reference to FIG. 3 will now be described in more detail for particular embodiments utilizing least squares optimization. In this example, the channel coefficients ĉ(k) and the auto-correlation of the baseband disturbance $\hat{\rho}_{vv}(k)$ are jointly estimated. This estimation can be expressed as the solution of the following minimization criteria:

$$\hat{c}(k) = \underset{(c(k),\rho_{vv}(k))}{\arg\min} \sum_{n=n0+L}^{n0+M-1} |r(n) - \hat{r}[n\,|\,n-1; c(k); \rho_{vv}(k)]|^2 \quad (7)$$

where $\hat{r}[n|n-1;c(k);\rho_{vv}(k)]$ is the one-step ahead prediction of r(n) given {r(k):k<n}, {s(k):k≦n}, channel coefficients c(k) and the auto-correlation of the disturbance $\rho_{vv}(k)$.

For this example, the pair $(c(k), \rho_{vv}(k))$ is determined that minimizes the criteria in equation (7) using, for example, the Generalized Least Squares (GLS) algorithm, as described generally in L. Ljung, *System Identification: Theory for the User*, Prentice-Hall, 1987, an iterative approach which can be described by the following steps:

1. Find an initial least-squares estimate for the channel coefficients ĉ(k) using equation (4) with given {r(n)} and {s(n)} (block 305).

2. Assuming that the previous channel estimate ĉ(k) is correct, obtain a new estimate of $\rho_{vv}(k)$ (block 310).

3. Assuming that the previous auto-correlation estimate $\rho_{vv}(k)$ is correct, obtain a new estimate of ĉ(k) using equation (7) (blocks 315 through 320).

4. Go back to step (2) and repeat for a desired number of iterations (block 325).

The above four steps provide one of many possible ways to implement equation (7) and are not intended to be limiting of the present invention.

In embodiments of the present invention, the GLS algorithm is applied in an adaptive manner which may provide improved channel estimates. Operations for each of the steps will now be described in further detail for exemplary embodiments to obtain an adaptive channel estimate. Step 1 may be implemented using a conventional least squares estimation as described in L. Ljung, *System Identification: Theory for the User*, Prentice-Hall, 1987. In Step 2, the disturbance correlation $\rho_{vv}(k)$ may be estimated from the received signal {r(n)} and the known symbols {s(n)} ad the previous channel estimate ĉ(k) by:

$$\hat{\rho}_{vv}(l) = \frac{1}{M-L} \sum_{n=n0+L}^{n0+M-1-l} \left( r(n+l) - \sum_{k=0}^{L-1} \hat{c}(k)s(n+l-k) \right) \left( r(n) - \sum_{k=0}^{L-1} \hat{c}(k)s(n-k) \right)^* \quad (8)$$

where $\hat{\rho}_{vv}(l)$ is an estimate of the l-the auto-correlation lag of the disturbance v(n), l is the auto-correlation lag, M is the number of known transmitted symbols, L is the length of the channel estimate (such as the number of channel coefficients), n0 is the index of the first known transmitted symbol, ĉ(k) is a previously obtained channel estimate, r(n)

is the discrete-time received signal and s(n) are the known transmitted symbols ĉ(k) is given by Step 1.

Step 3 can be implemented as follows:

1. Compute a finite impulse response (FIR) whitening filter $\{h(k)\}_{k=0}^{k=q}$ for the given $\hat{\rho}_{vv}(k)$ using well-known algorithms, such as the Levinson-Durbin algorithm, cf. S. M. Kay, *Modern Spectral Estimation: Theory and Application*, Prentice-Hall, 1988 (block 315).

2. Filter r(n) and s(n) to obtain r'(n)=h(n)*r(n) and s'(n)=h(n)*s(n) (block 318).

3. Find a least-squares estimate for the channel coefficients ĉ(k) with the given r'(n) and s'(n), i.e.

$$\hat{c}(k) = \underset{c(k)}{\arg \min} \sum_{n=n0+L}^{n0+M-1} \left| r'(n) - \sum_{k=0}^{L-1} c(k)s'(n-k) \right|^2 \quad (9)$$

where r'(n) is r(n) filtered by the whitening filter, s'(n−k) is s(n) filtered by the whitening filter and delayed by k samples and q+1 is the length of the whitening filter (block 320).

The determination and use of a whitening filter to whiten the received signals in Steps 1 and 2 (blocks 315 and 318) is further described in U.S. Pat. application Ser. No. 09/450,684 entitled "Methods, Receiver Devices and Systems for Whitening a Signal Disturbance in a Communication Signal" which is hereby incorporated herein by reference as if set forth in its entirety.

Figure 4:
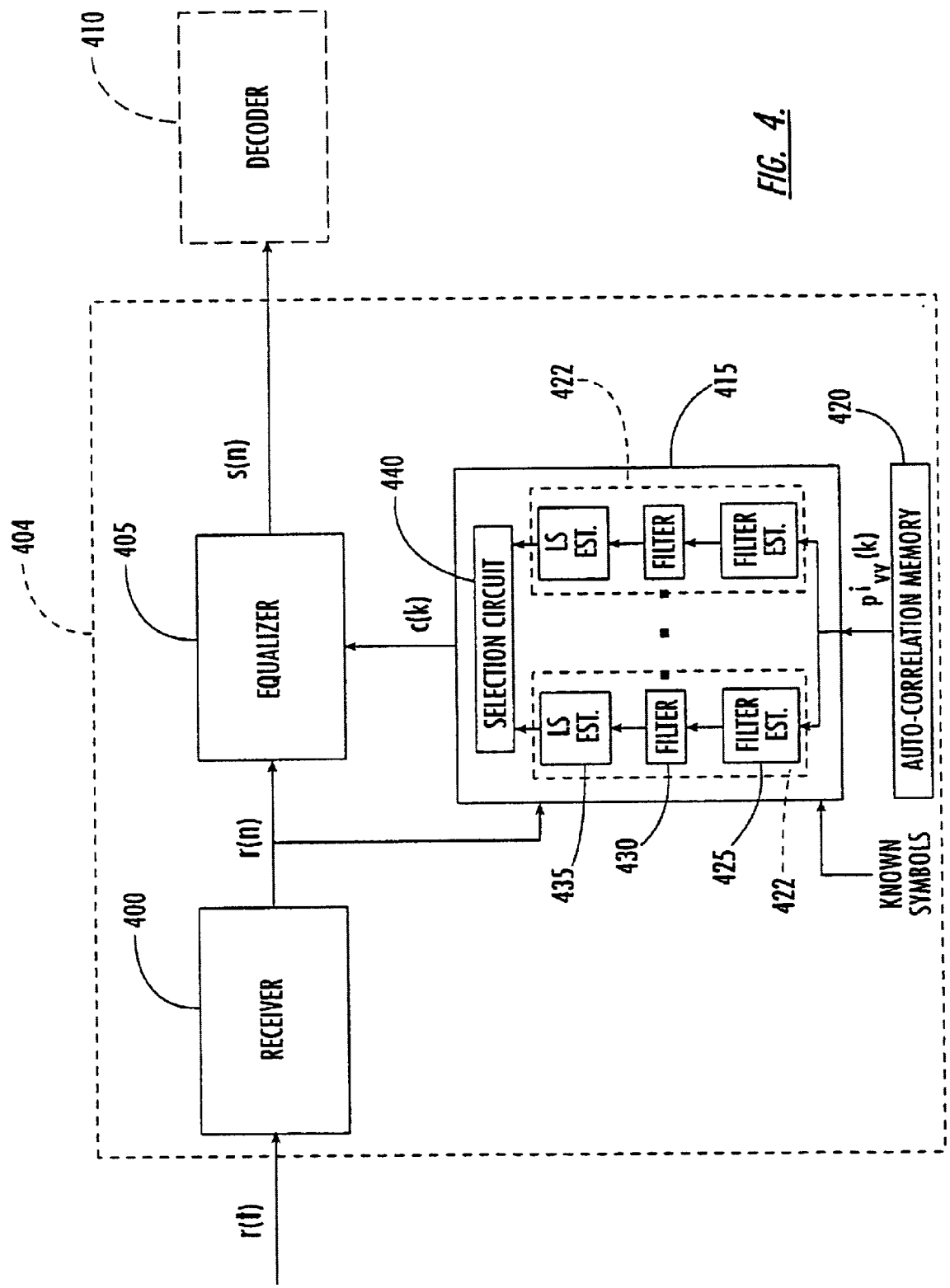
FIG. 4 is a schematic block diagram illustrating a receiver device according to further embodiments of the present invention.

Referring now to the block diagram illustration of FIG. 4 further embodiments of a receiver device for receiving a communication signal subject to colored noise over a communication channel will now be further described. The receiver device 404 of the embodiments shown in FIG. 4 includes a receiver 400 which operates in a manner similar to that described previously with reference to the receiver 200 of FIG. 2 and further includes an equalizer 405 which may operate in a manner similar to that described for the equalizer 205 in FIG. 2. Symbol estimates from the equalizer 405 may be provided to further signal processing circuitry, such as a decoder 410. The receiver device of the embodiment of FIG. 4 further includes a channel estimator 415 and an auto-correlation memory 420 coupled to the channel estimator 415.

The channel estimator 415 generates the channel coefficients c(k) and provides these channel coefficients to the equalizer 405 utilizing a plurality of candidate auto-correlations $\rho^i_{vv}(k)$ obtained from the auto-correlation memory 420. More particularly, the channel estimator 415 includes a plurality of coefficient estimation circuits 422 each including, in the illustrated embodiments, a whitening filter estimation circuit 425, a whitening filter 430 and a least squares channel coefficient estimation circuit 435. Each of the plurality of candidate auto-correlations is processed by one of the coefficient estimation circuits 422 and the resulting plurality of channel coefficient sets is provided to the selection circuit 440. The selection circuit 440 is configured to select one of the generated channel coefficient sets as the channel coefficients and provide the selected set to the equalizer 405.

Referring now to the flowchart illustration of FIG. 5, operations for receiving a communication signal subject to colored noise over a communication channel will now be described. Operations begin at block 500 with receipt of the communication signal including the colored noise. In this embodiment, a plurality of candidate auto-correlations are selected for use in generating channel coefficients (block 505). The candidate auto-correlation values are preferably selected to include a range of auto-correlations likely to be encountered on a communication channel.

One of the plurality of candidate auto-correlations is then selected (block 510). A whitening filter is determined based on the selected one of the plurality of auto-correlations (block 515). Alternatively, the whitening filters may be determined in advance for each candidate auto-correlation value and saved in memory, in which case, the predetermined whitening filter is selected at block 515. The received signal and the predetermined information associated with the received signal, such as a synchronization signal, is filtered using the determined whitening filter (block 520). A set of channel coefficients based on the filtered received signal and the filtered predetermined information is generated for the selected candidate auto-correlation (block 525).

If an additional candidate auto-correlation remains (block 530) operations at blocks 510 through 525 repeat until a set of channel coefficients has been generated for each of the candidate auto-correlation values. Among these N pairs of channel estimates and auto correlation estimates, the one that minimizes the ML criteria in equation (7) is chosen (block 532). A signal estimate is then generated for the receive signal using the determined channel estimate (block 535).

Operations as generally described with reference to FIG. 5 will now be described in more detail for particular embodiments utilizing least squares optimization. In this example, the auto-correlation of the disturbance is assumed to belong to a finite set of candidate auto-correlations, and this set is either known or determined in advance (block 505). For purposes of this description, these candidate auto-correlations shall be expressed as $\{\hat{\rho}_1^{vv}(k)\}_{i=1}^{N}$, where N denotes the number of candidate autocorrelations. For each candidate auto-correlation $\hat{\rho}_1^{vv}(k)$, the channel estimate, $\hat{c}^i(k)$, is generated using the equation (blocks 510–530):

$$\hat{c}_i(k) = \underset{c(k)}{\arg \min} \sum_{n=n0+L+q_i}^{n0+M-1} \left| r'_i(n) - \sum_{k=0}^{L-1} c(k)s'_i(n-k) \right|^2, \quad (10)$$

where $r_i'(n)$ is r(n) filtered by the whitening filter associated with this candidate autocorrelation, s'(n−k) is s(n) filtered by the whitening filter and delayed by k samples, and $q_i+1$ is the length of the whitening filter. Finally, among these N pairs of channel estimates and auto-correlation estimates, the one that has the smallest associated squared-error given by the equation:

$$\varepsilon_i = \sum_{n=n0+L+q_i}^{n0+M-1} \left| r'_i(n) - \sum_{k=0}^{L-1} \hat{c}_i(k)s'_i(n-k) \right|^2. \quad (11)$$

is chosen (block 532).

As noted above, because the candidate auto-correlations $\{\hat{\rho}^1_{vv}(k)\}_{i=1}^{N}$ are known in advance in this method, the whitening filter h(n) corresponding to each $\hat{\rho}^1_{vv}(k)$ can be pre-computed and stored in memory and selected from memory at block 515.

Figure 6:
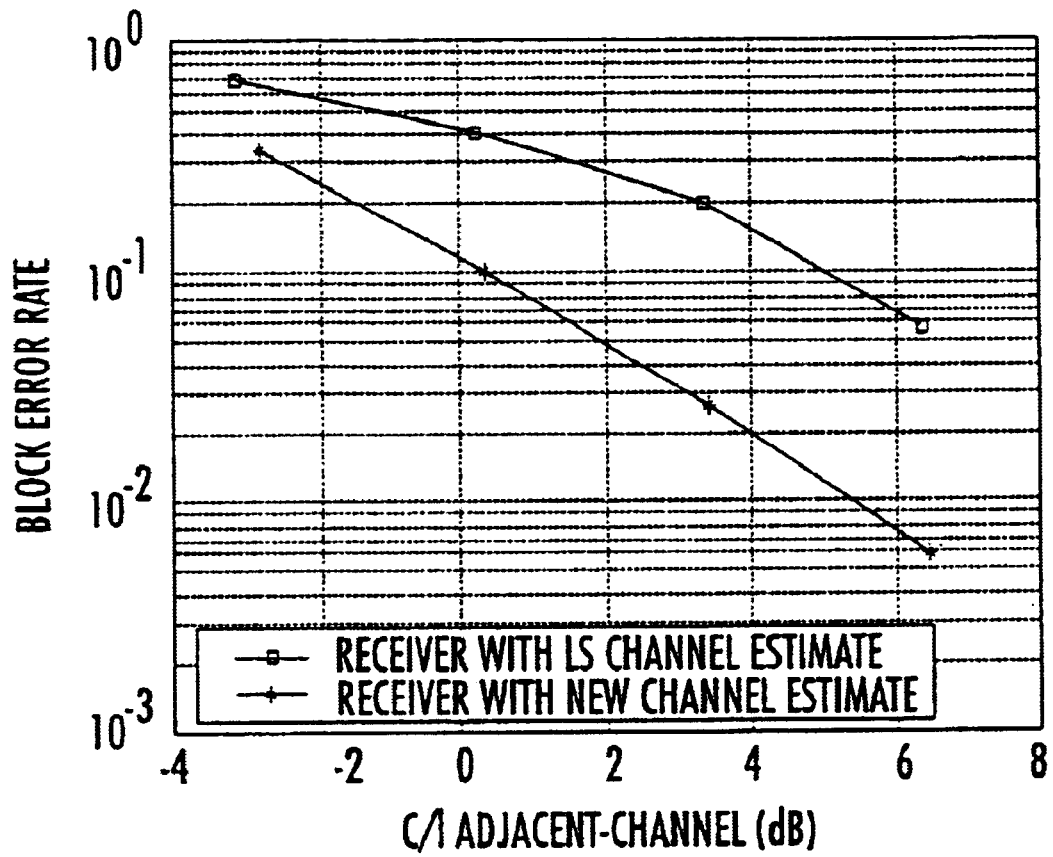
FIG. 6 is a graph illustrating an example of performance characteristics for a receiver device according to an embodiment of the present invention.

The present invention may benefit a variety of cellular receivers that perform channel estimation in the presence of colored baseband noise. Such receivers include GSM receivers and Enhanced Data rates for Global Evolution (EDGE) receivers. A simulation has been performed implementing the present invention for 8PSK(8 symbol phase shift keyed)-EDGE. In this simulation, the Block Error Rate (BLER) performance versus Carrier to adjacent channel Interference power ration (C/Iadj) improves by more than 4 decibels at a 10% block error rate in a Typical channel at a speed of three kilometers per hour with ideal Frequency Hopping (TU3iFH) channel using the present invention. The results of this simulation are graphically illustrated in FIG. 6.

Figure 5:
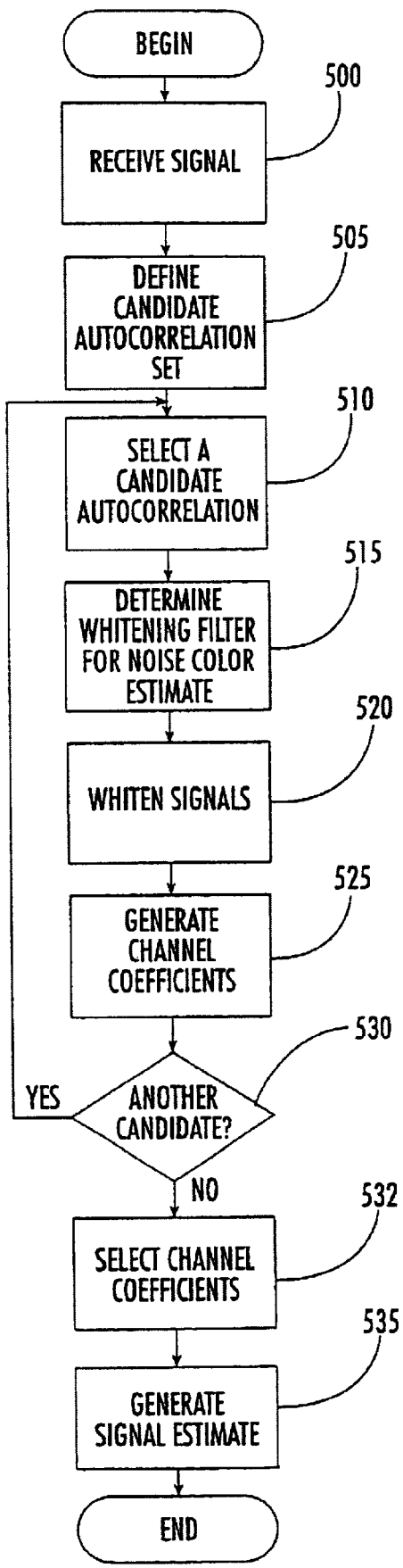
FIG. 5 is a flowchart illustrating operations for further embodiments of the present invention.

The present invention has been described above with respect to the block diagram illustrations of FIGS. 2 and 4 the flowchart illustrations of FIGS. 3 and 5. It will be understood that each block of the flowchart illustrations and the block diagram illustrations of FIGS. 2 through 5, and combinations of blocks in the flowchart illustrations and the block diagram illustrations of FIGS. 2 through 5, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions. For example, while various components of receiver device 204 have been illustrated in FIG. 2, in part, as discrete elements, they may, in practice, be implemented by a micro controller including input and output ports and running software code, by custom or hybrid chips, by discrete components or by a combination of the above. For example, the equalizer 205 and the channel estimator 215 may be implemented in part as code executing on a processor.

The present invention has been described above primarily with reference to MLSE equalizers. However, the present invention is not so limited and may also be applied to other types of equalizers, for example, Decision Feedback Sequence Estimator (DFSE) equalizers.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for receiving a communication signal subject to colored noise over a communication channel, the method comprising the steps of:
   receiving the communication signal including the colored noise;
   determining a channel estimate for the communication channel using a generalized least squares algorithm based on the received signal, predetermined information associated with the received signal and an estimated characteristic of the colored noise; and
   generating a signal estimate for the received signal using the determined channel estimate.

2. A method for receiving a communication signal subject to colored noise over a communication channel, the method comprising the steps of:
   receiving the communication signal including the colored noise;
   determining a channel estimate for the communication channel based on the received signal, predetermined information associated with the received signal and an auto-correlation of the colored noise; and
   generating a signal estimate for the received signal using the determined channel estimate; and
   wherein the step of determining a channel estimate for the communication channel comprises the steps of:
      generating a least squares initial channel estimate based on an assumed white noise auto-correlation, the received signal and the predetermined information;
      generating an updated auto-correlation based on the initial channel estimate, the received signal and the predetermined information; and
      generating a least squares updated channel estimate based on the updated auto-correlation.

3. A method for receiving a communication signal subject to colored noise over a communication channel, the method comprising the steps of:
   receiving the communication signal including the colored noise;
   determining a channel estimate for the communication channel based on the received signal, predetermined information associated with the received signal and an auto-correlation of the colored noise; and
   generating a signal estimate for the received signal using the determined channel estimate; and
   wherein the step of determining a channel estimate for the communication channel comprises the steps of:
      generating an initial channel estimate based on an assumed auto-correlation, the received signal and the predetermined information;
      generating an updated auto-correlation based on the initial channel estimate, the received signal and the predetermined information; and
      generating an updated channel estimate based on the updated auto-correlation, the received signal and the predetermined information.

4. A method according to claim 3 wherein the step of generating an initial channel estimate comprises the step of generating initial channel coefficients and wherein the step of generating an updated channel estimate comprises the step of generating updated channel coefficients based on the updated auto-correlation.

5. A method according to claim 4 wherein the step of generating a signal estimate for the received signal is preceded by the step of repeating the steps of generating initial channel coefficients, generating an updated auto-correlation and generating updated channel coefficients for a selected number of iterations.

6. A method according to claim 5 wherein the repeating step comprises the step of repeating the steps of generating initial channel coefficients, generating an updated auto-correlation and generating updated channel coefficients for a predetermined number of repetitions.

7. A method according to claim 5 wherein the repeating step comprises the step of repeating the steps of generating initial channel coefficients, generating an updated auto-correlation and generating updated channel coefficients until a performance criteria is satisfied.

8. A method according to claim 5 wherein the step of generating initial channel coefficients comprises the step of generating initial channel coefficients using the equation $$\hat{c}(k) = \underset{c(k)}{\arg\min} \sum_{n=n0+L}^{n0+M-1} |r(n) - \hat{r}[n \mid n-1; c(k); \rho_{vv}(k) = \delta(k)]|^2$$

where $\hat{r}[n|n-1;c(k);\rho_{vv}(k)]$ is a one-step ahead prediction of $r(n)$ given $\{r(k):k<n\}$, $\{s(k):k\leq n\}$, channel coefficients $c(k)$ and assuming $\rho_{vv}(k)=\delta(k)$.

9. A method according to claim 8 wherein the step of generating an updated auto-correlation comprises the step of generating an updated auto-correlation using the equation $$\hat{\rho}_{vv}(l) = \frac{1}{M-L} \sum_{n=n0+L}^{n0+M-1-l} \left( r(n+l) - \sum_{k=0}^{L-1} \hat{c}(k)s(n+l-k) \right) \left( r(n) - \sum_{k=0}^{L-1} \hat{c}(k)s(n-k) \right)^*$$

where $\hat{\rho}_{vv}(l)$ is an estimate of an lth-auto-correlation lag of the disturbance $v(n)$, l is the auto-correlation lag, M is a number of units of the predetermined information, L is a number of the channel coefficients, n0 is an index of the first transmitted unit of the predetermined information, $\hat{c}(k)$ is a previously obtained channel estimate, $r(n)$ is the received signal and $s(n)$ is the predetermined information.

10. A method according to claim 9 wherein the step of generating updated channel coefficients comprises the steps of:
   determining a whitening filter based on the updated auto-correlation;
   filtering the received signal and the predetermined information associated with the received signal using the determined whitening filter; and
   generating updated channel coefficients based on the filtered received signal, the filtered predetermined information associated with the received signal and the updated auto-correlation using the equation $$\hat{c}(k) = \underset{c(k)}{\arg\min} \sum_{n=n0+L+q}^{n0+M-1} \left| r'(n) - \sum_{k=0}^{L-1} c(k)s'(n-k) \right|^2$$

where $r'(n)$ is $r(n)$ filtered by the whitening filter, $s'(n-k)$ is $s(n)$ filtered by the whitening filter and delayed by k samples and $q+1$ is a length of the whitening filter.

11. A method according to claim 10 wherein the step of determining a whitening filter comprises the step of determining a finite impulse response whitening filter based on the updated auto-correlation.

12. A method according to claim 5 wherein the communication signal comprises a plurality of bursts and wherein the predetermined information associated with the received signal is a synchronization signal included in each of the plurality of bursts and wherein the step of determining a channel estimate for the communication channel is executed for each respective burst based on the synchronization signal included in the respective burst to provide a channel estimate associated with the respective burst and wherein the step of generating a signal estimate for the received signal comprises the step of generating a signal estimate for each respective burst using the channel estimate associated with the respective burst.

13. A method for receiving a communication signal subject to colored noise over a communication channel, the method comprising the steps of:
   receiving the communication signal including the colored noise;
   determining a channel estimate for the communication channel based on the received signal, predetermined information associated with the received signal and an estimated characteristic of the colored noise and selecting a maximum likelihood one of a plurality of candidate channel estimates as the channel estimate wherein each of the plurality of candidate channel estimates is based on one of a plurality of candidate noise color characteristic of the colored noise; and
   generating a signal estimate for the received signal using the determined channel estimate.

14. A method for receiving a communication signal subject to colored noise over a communication channel, the method comprising the steps of:
   receiving the communication signal including the colored noise;
   determining a channel estimate for the communication channel based on the received signal, predetermined information associated with the received signal and an auto-correlation of the colored noise; and
   generating a signal estimate for the received signal using the determined channel estimate; and
   wherein the step of determining a channel estimate for the communication channel comprises the steps of:
      generating a plurality of candidate channel estimates wherein each of the plurality of candidate channel estimates is based on one of a plurality of candidate auto-correlations; and
      selecting one of the plurality of candidate channel estimates as the channel estimate.

15. A method according to claim 14 wherein the step of generating a plurality of candidate channel estimates comprises the step of generating a plurality of sets of channel coefficients and wherein the step of selecting one of the plurality of candidate channel estimates comprises the step of selecting one of the sets of channel coefficients as the channel coefficients.

16. A method according to claim 15 wherein the step of generating a plurality of sets of channel coefficients comprises the steps of:
   selecting one of the plurality of candidate auto-correlations;
   determining a whitening filter based on the selected one of the plurality of auto-correlations;
   filtering the received signal and the predetermined information associated with the received signal using the determined whitening filter;
   generating one of the plurality of sets of channel coefficients based on the filtered received signal and the filtered predetermined information associated with the received signal; and
   repeating the step of selecting, determining a whitening filter, filtering and generating one of the plurality of sets of channel coefficients for others of the plurality of candidate auto-correlations to provide the plurality of sets of channel coefficients.

17. A method according to claim 16 wherein the step of generating one of the plurality of sets of channel coefficients further comprises the step of generating one of the plurality of sets of channel coefficients using the equation:

$$\hat{c}_1(k) = \arg\min_{c(k)} \sum_{n=n0+L+q_i}^{n0+M-1} \left| r'_i(n) - \sum_{k=0}^{L-1} c(k)s'_i(n-k) \right|^2$$

where i indicates one of the plurality of sets of channel coefficients, r'(n) is r(n) filtered by the whitening filter associated with the selected candidate auto-correlation, $r_i'$(n−k) is s(n) filtered by the whitening filter and delayed by k samples, and $q_i$+1 is a length of the whitening filter.

18. A method according to claim 17 wherein the step of selecting one of the plurality of candidate channel estimates as the channel estimate comprises the step of selecting as the channel estimate one of the plurality of candidate channel estimates that has a smallest associated squared-error given by the equation:

$$\varepsilon_i = \sum_{n=n0+L+q_i}^{n0+M-1} \left| r'_i(n) - \sum_{k=0}^{L-1} \hat{c}_i(k)s'_i(n-k) \right|^2$$

where i indicates one of the plurality of candidate channel estimates.

19. A method according to claim 16 wherein the step of determining a whitening filter based on the selected one of the plurality of auto-correlations is preceded by the step of generating and storing a whitening filter for each of the plurality of candidate auto-correlations and wherein the step of determining a whitening filter comprises the step of selecting one of the stored whitening filters as the whitening filter.

20. A method according to claim 16 wherein the communication signal comprises a plurality of bursts and wherein the predetermined information associated with the received signal is a synchronization signal included in each of the plurality of bursts and wherein the step of determining a channel estimate for the communication channel is executed for each respective burst based on the synchronization signal included in the respective burst to provide a channel estimate associated with the respective burst and wherein the step of generating a signal estimate for the received signal comprises the step of generating a signal estimate for each respective burst using the channel estimate associated with the respective burst.

21. A receiver device comprising:
a receiver that receives wireless communication signals including a signal disturbance having an associated noise color and downsamples the received signals to a symbol rate of the communication signals to provide received signal samples;
an equalizer that generates symbol estimates from the received signal samples, the equalizer having associated channel coefficients; and
a channel estimator that generates the channel coefficients based on the received wireless communication signals, predetermined information associated with the received wireless communication signals and the associated noise color of the signal disturbance; and
wherein the channel estimator is further configured to iteratively estimate the channel coefficients and the associated noise color by setting one of the channel coefficients and the associated noise color to a value generated in a previous iteration and solving for the other of the channel coefficients and the associated noise color and to use the other of the channel coefficients and the associated noise color as the value generated in a previous iteration in a subsequent iteration.

22. A receiver device according to claim 21 wherein the predetermined information is a synchronization signal and the associated noise color is an auto-correlation of the signal disturbance.

23. A receiver device comprising:
a receiver that receives wireless communication signals including a signal disturbance having an associated noise color and downsamples the received signals to a symbol rate of the communication signals to provide received signal samples;
an equalizer that generates symbol estimates from the received signal samples, the equalizer having associated channel coefficients; and
a channel estimator that generates the channel coefficients based on the received wireless communication signals, predetermined information associated with the received wireless communication signals and the associated noise color of the signal disturbance; and
wherein the associated noise color is an auto-correlation of the signal disturbance and wherein the receiver device further comprises a memory configured to store a plurality of candidate auto-correlations and wherein the channel estimator is further configured to generate channel coefficient sets based on each of the plurality of candidate auto-correlations and to select one of the generated channel coefficient sets as the channel coefficients.

24. A receiver device according to claim 23 wherein the channel estimator is further configured to select as the channel coefficients one of the generated channel coefficient sets that has a smallest associated squared-error given by the equation $$\varepsilon_i = \sum_{n=n0+L+q_i}^{n0+M-1} \left| r'_i(n) - \sum_{k=0}^{L-1} \hat{c}_i(k)s'_i(n-k) \right|^2$$

where i indicates one of the plurality of sets of channel coefficients, $r_i$'(n) is r(n) filtered by a whitening filter associated with the selected candidate auto-correlation, $s_i$'(n−k) is s(n) filtered by the whitening filter and delayed by k samples, and $q_i$+1 is a length of the whitening filter.

25. A receiver device according to claim 24 wherein the predetermined information is a synchronization signal.

26. A system for receiving a communication signal subject to colored noise over a communication channel, the system comprising:
means for receiving the communication signal including the colored noise;
means for determining a channel estimate for the communication channel using a generalized least squares algorithm based on the received signal, predetermined information associated with the received signal and an estimated characteristic of the colored noise; and
means for generating a signal estimate for the received signal using the determined channel estimate.

27. A system for receiving a communication signal subject to colored noise over a communication channel, the system comprising:
means for receiving the communication signal including the colored noise;
means for determining a channel estimate for the communication channel based on the received signal, predetermined information associated with the received signal and an auto-correlation of the colored noise; and means for generating a signal estimate for the received signal using the determined channel estimate; and wherein the means for determining a channel estimate for the communication channel comprises:

means for generating an initial channel estimate based on an assumed auto-correlation, the received signal and the predetermined information;

means for generating an updated auto-correlation based on the initial channel estimate, the received signal and the predetermined information; and means for generating an updated channel estimate based on the updated auto-correlation.

28. A system according to claim 27 wherein the means for generating an initial channel estimate comprises means for generating initial channel coefficients and wherein the means for generating an updated channel estimate comprises the step of generating updated channel coefficients based on the updated auto-correlation.

29. A system according to claim 28 wherein the means for determining a channel estimate further comprises means for iteratively generating the updated channel coefficients and the updated auto-correlation for a selected number of iterations.

30. A system according to claim 29 wherein the means for generating initial channel coefficients comprises means for generating initial channel coefficients using the equation $$\hat{c}(k) = \underset{c(k)}{\arg\min} \sum_{n=n0+L}^{n0+M-1} |r(n) - \hat{r}[n \mid n-1; c(k); \rho \, vv(k) = \delta(k)]|^2$$

where $\hat{r}[n|n-1;c(k);\rho_{vv}(k)]$ is a one-step ahead prediction of $r(n)$ given $\{r(k):k<n\}$, $\{s(k):k\leq n\}$, channel coefficients $c(k)$ and assuming $\rho_{vv}(k)=\delta(k)$.

31. A system according to claim 30 wherein the means for generating an updated auto-correlation comprises means for generating an updated auto-correlation using the equation $$\hat{\rho}_{vv}(l) =$$

$$\frac{1}{M-L} \sum_{n=n0+L}^{n0+M-1-l} \left( r(n+1) - \sum_{k=0}^{L-1} \hat{c}(k)s(n+1-k) \right) \left( r(n) - \sum_{k=0}^{L-1} \hat{c}(k)s(n-k) \right)^*$$

where $\hat{\rho}_{vv}(l)$ is an estimate of the lth- auto-correlation lag of the disturbance $v(n)$, l is the auto-correlation lag, M is a number of units of the predetermined information, L is a number of the channel coefficients, n0 is an index of the first transmitted unit of the predetermined information, $\hat{c}(k)$ is a previously obtained channel estimate, $r(n)$ is the received signal and $s(n)$ is the predetermined information.

32. A system according to claim 31 wherein the means for generating updated channel coefficients comprises:

means for determining a whitening filter based on the updated auto-correlation;

means for filtering the received signal and the predetermined information associated with the received signal using the determined whitening filter; and means for generating updated channel coefficients based on the filtered received signal, the filtered predetermined information associated with the received signal and the updated auto-correlation using the equation $$\hat{c}(k) = \underset{c(k)}{\arg\min} \sum_{n=n0+L+q}^{n0+M-1} \left| r'(n) - \sum_{k=0}^{L-1} c(k)s'(n-k) \right|^2$$

where $r'(n)$ is $r(n)$ filtered by the whitening filter, $s'(n-k)$ is $s(n)$ filtered by the whitening filter and delayed by k samples and q+1 is a length of the whitening filter.

33. A system according to claim 32 wherein the means for determining a whitening filter comprises means for determining a finite impulse response whitening filter based on the updated auto-correlation.

34. A system according to claim 29 wherein the communication signal comprises a plurality of bursts and wherein the predetermined information associated with the received signal is a synchronization signal included in each of the plurality of bursts and wherein the means for determining a channel estimate for the communication channel comprises means for determining a channel estimate for respective bursts of the plurality of bursts based on the synchronization signal included in the respective burst to provide a channel estimate associated with the respective burst and wherein the means for generating a signal estimate for the received signal comprises means for generating a signal estimate for each respective burst using the channel estimate associated with the respective burst.

35. A system for receiving a communication signal subject to colored noise over a communication channel, the system comprising:

means for receiving the communication signal including the colored noise;

means for determining a channel estimate for the communication channel based on the received signal, predetermined information associated with the received signal and an estimated characteristic of the colored noise and selecting a maximum likelihood one of a plurality of candidate channel estimates as the channel estimate wherein each of the plurality of candidate channel estimates is based on one of a plurality of candidate noise color characteristic of the colored noise; and means for generating a signal estimate for the received signal using the determined channel estimate.

36. A system for receiving a communication signal subject to colored noise over a communication channel, the system comprising:

means for receiving the communication signal including the colored noise;

means for determining a channel estimate for the communication channel based on the received signal, predetermined information associated with the received signal and an auto-correlation of the colored noise; and means for generating a signal estimate for the received signal using the determined channel estimate; and wherein the means for determining a channel estimate for the communication channel further comprises:

means for generating a plurality of candidate channel estimates wherein each of the plurality of candidate channel estimates is based on one of a plurality of candidate auto-correlations; and means for selecting one of the plurality of candidate channel estimates as the channel estimate.

37. A system according to claim 36 wherein the means for generating a plurality of candidate channel estimates comprises means for generating a plurality of sets of channel coefficients and wherein the means for selecting one of the plurality of candidate channel estimates comprises means for selecting one of the sets of channel coefficients as the channel coefficient.

38. A system according to claim 37 wherein the means for generating a plurality of sets of channel coefficients comprises:
means for determining a whitening filter for each of a plurality of auto-correlations;
means for filtering the received signal and the predetermined information associated with the received signal using the determined whitening filters for each of the plurality of auto-correlations to provide a plurality of filtered received signals and predetermined information; and
means for generating a set of channel coefficients for each of the plurality of auto-correlations based on an associated one of the plurality of filtered received signals and predetermined information associated with the received signal to provide the plurality of sets of channel coefficients.

39. A system according to claim 38 wherein the means for generating a set of channel coefficients further comprises means for generating a set of channel coefficients for each of the plurality of auto-correlations using the equation $$\hat{c}_1(k) = \arg\min_{c(k)} \sum_{n=n0+L+q_i}^{n0+M-1} \left| r'_i(n) - \sum_{k=0}^{L-1} c(k) s'_i(n-k) \right|^2$$

where i indicates a particular set of channel coefficients, $r_i(n)$ is $r(n)$ filtered by a whitening filter associated with the selected candidate auto-correlation, $s_i'(n-k)$ is $s(n)$ filtered by the whitening filter and delayed by k samples, and $q_i+1$ is the length of the whitening filter.

40. A system according to claim 39 wherein the means for selecting one of the plurality of candidate channel estimates as the channel estimate comprises means for selecting as the channel estimate one of the plurality of candidate channel estimates that has a smallest associated squared-error given by the equation $$\varepsilon_i = \sum_{n=n0+L+q_i}^{n0+M-1} \left| r'_i(n) - \sum_{k=0}^{L-1} \hat{c}_i(k) s'_i(n-k) \right|^2$$

where i indicates one of the plurality of sets of channel coefficients.

41. A system according to claim 38 further comprising means for generating and storing a whitening filter for each of the plurality of candidate auto-correlations and wherein the means for determining a whitening filter comprises the step of selecting an associated one of the stored whitening filters as the whitening filter for each of the plurality of candidate auto-correlations.

42. A system according to claim 38 wherein communication signal comprises a plurality of bursts and wherein the predetermined information associated with the received signal is a synchronization signal included in each of the plurality of bursts and wherein the means for determining a channel estimate for the communication channel comprises means for determining a channel estimate for the communication channel for each respective burst based on the synchronization signal included in the respective burst to provide a channel estimate associated with the respective burst and wherein the means for generating a signal estimate for the received signal comprises means for generating a signal estimate for each respective burst using the channel estimate associated with the respective burst.

43. A method for receiving a communication signal subject to colored noise over a communication channel, the method comprising the steps of:
receiving the communication signal including the colored noise;
determining a channel estimate for the communication channel based on the received signal, predetermined information associated with the received signal and an auto-correlation of the colored noise; and
generating a signal estimate for the received signal using the determined channel estimate;
wherein the step of determining a channel estimate for the communication channel comprises the steps of:
generating an initial channel estimate based on an assumed auto-correlation, the received signal and the predetermined information;
generating an updated auto-correlation based on the initial channel estimate, the received signal and the predetermined information; and
generating an updated channel estimate based on the updated auto-correlation, the received signal and the predetermined information; and
wherein the step of generating an updated channel estimate comprises the steps of:
determining a whitening filter based on the updated auto-correlation;
filtering the received signal and the predetermined information associated with the received signal using the determined whitening filter; and
generating the updated channel estimate based on the filtered received signal, the filtered predetermined information associated with the received signal and the updated auto-correlation.

44. A system for receiving a communication signal subject to colored noise over a communication channel, the system comprising:
means for receiving the communication signal including the colored noise;
means for determining a channel estimate for the communication channel based on the received signal, predetermined information associated with the received signal and an auto-correlation of the colored noise; and
means for generating a signal estimate for the received signal using the determined channel estimate; and
wherein the means for determining a channel estimate for the communication channel comprises:
means for generating an initial channel estimate based on an assumed auto-correlation, the received signal and the predetermined information;
means for generating an updated auto-correlation based on the initial channel estimate, the received signal and the predetermined information; and
means for generating an updated channel estimate based on the updated auto-correlation, the received signal and the predetermined information; and
wherein the means for generating an updated channel estimate comprises:
means for determining a whitening filter based on the updated auto-correlation;
means for filtering the received signal and the predetermined information associated with the received signal using the determined whitening filter; and
means for generating the updated channel estimate based on the filtered received signal, the filtered predetermined information associated with the received signal and the updated auto-correlation.

* * * * *

UNITED STATES PATENT AND TRADEMARK OFFICE
CERTIFICATE OF CORRECTION

PATENT NO. : 6,674,820 B1
DATED : January 6, 2004
INVENTOR(S) : Hui et al.

It is certified that error appears in the above-identified patent and that said Letters Patent is hereby corrected as shown below:

Column 15,
Lines 8-9, should read -- $r'_i(n)$ is $r(n)$ filtered by the whitening filter associated with the selected candidate auto-correlation, $s'_i$ --

Signed and Sealed this

Twenty-ninth Day of June, 2004

JON W. DUDAS
*Acting Director of the United States Patent and Trademark Office*